United States Patent Office 2,779,054
Patented Jan. 29, 1957

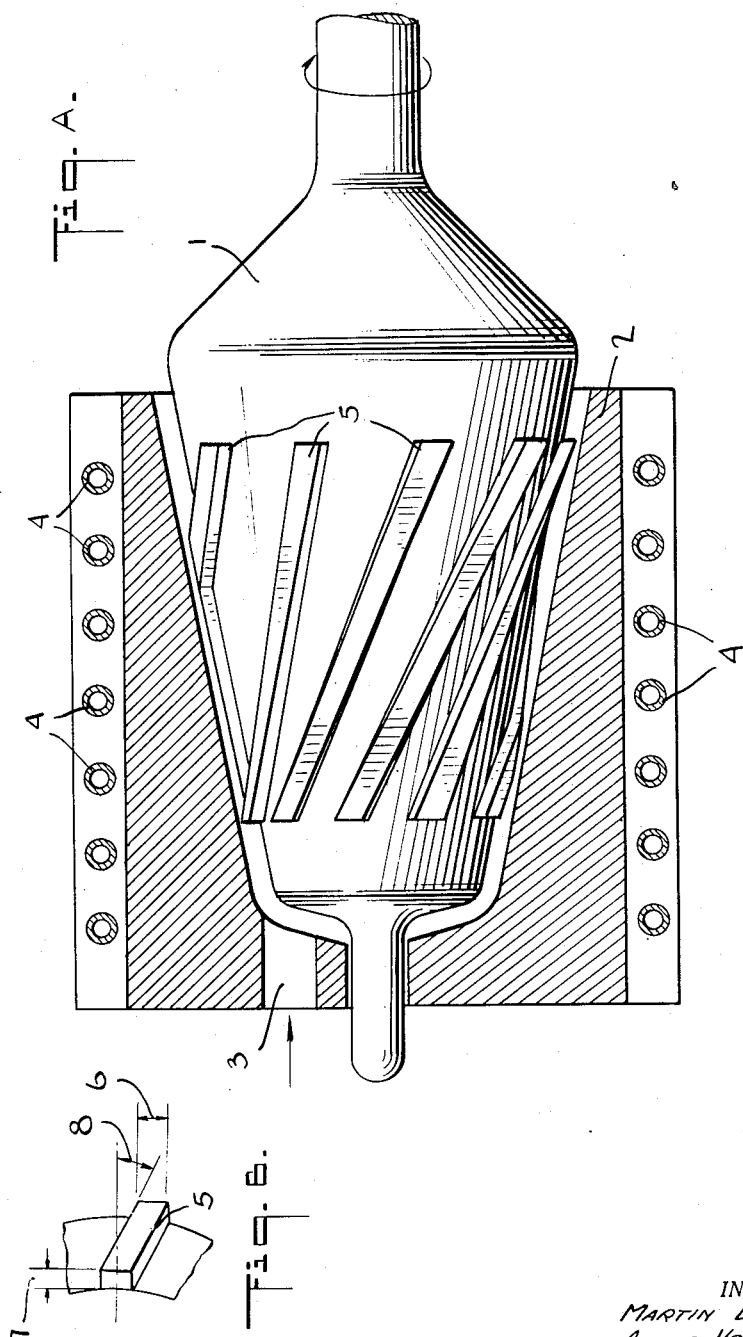

2,779,054

APPARATUS FOR HOMOGENIZING AND KNEADING PLASTIC MASSES

Martin Doriat, Burghausen, Upper Bavaria, and Adolf Vogt, Munich, Germany, assignors to Wacker-Chemie G. m. b. H., Munich, Germany, a corporation of Germany Application November 23, 1953, Serial No. 393,846

Claims priority, application Germany November 25, 1952

2 Claims. (Cl. 18—2)

This invention relates to the art of homogenizing and kneading plastic masses, and it has for its object to provide a novel and improved apparatus for this purpose.

Another object of the invention is to provide a more efficient apparatus for homogenizing and kneading plastic masses than any heretofore available.

Various other objects and advantages will be apparent as the nature of the invention is more fully disclosed.

The present invention is an improvement upon that disclosed in the copending application of Adolf Vogt, Serial No. 312,039, filed September 29, 1952, now Patent No. 2,763,896, issued September 25, 1956, wherein the mass of plastifiable material under pressure, and if necessary while heated, is introduced centrally into a restricted space or slit between working surfaces which are entirely or approximately axially identical and are arranged opposite each other, while said working surfaces are subjected to a motion relatively to each other about their common axis.

More specifically, the mechanical homogenizing apparatus of said Vogt Patent No. 2,763,896 comprises a rotating conical body and a closely adjacent surrounding stationary conical sleeve. The plastic material is introduced into the cone-shaped space or slit between said body and said sleeve in the vicinity of the smaller diameter of the cone, and, during its passage from the small toward the large end of the cone, the plastic material is subjected to a continuous succession of ever-changing pressing, kneading, tearing, mixing, stretching and twisting forces.

In the above-described kneading device there are strains caused by the supplied material layer particularly because of the considerable transverse extension for the kneading effect which entails a longitudinal tearing up of the mantle at various points. In order to obtain a uniform subdivision of the material which is gradually transformed into a plastic condition and which is gripped in the feeding motion by the cone-shaped slit, and thereby to increase the homogeneity of the final product, according to the present invention the above-described conical revolving body is provided with ribs formed by applying thereto strips of plate which approximately fill up the slit, which is of substantially uniform width throughout its length, and slant in the direction of the axis, for the longitudinal subdivision of the material mantle or layer being fed into the device.

In order to select properly the transverse stretch forces according to the thermoplastic properties of the plastifiable materials and to react also upon the length of the plastifying zone, it is a feature of the present invention to be able to change or adjust the inclination of the ribs with respect to the direction of the cone form and to change also, if necessary, the spacing of said ribs. For the many sided use of such a machine for treating the most varied kinds of thermoplastic masses, with different plastification properties, a quick interchangeability of the essential kneading parts, hence of the ribbed mantle of the revolving conical body is necessary. According to the invention, bearing supports of various sets of ribbed mantles are provided which are differentiated from each other by the differences of the characteristic sizes. Such characteristic sizes for these important manufacturing parts are rib slanting, spacings of the ribs from each other, width and height of the ribs, and the rib distribution about the circumference of the rotatable cone, as well as the number of ribs.

In Fig. A, 1 is a plain cone on which a number of ribs 5 are arranged, in a conical casing 2, No. 3 is the opening for introducing the material, while No. 4 designates tubes in a mantle which permit heating and cooling. In Fig. B, a single rib 5 is illustrated. No. 6 is the rib width, No. 7 the rib height, while the angle 8 shows the slanting of the rib to the cone axis on the cone mantle. The rib width, rib height, number of ribs and the angle of inclination may be changed, according to the properties of various mixtures. As shown in Fig. A, the conical slit or space between cone 1 and the conical sleeve or casing 2 is of uniform width throughout its length, and the outlet end of said slit at the widest diameter of the cone is wholly unobstructed so that cooling air can enter and the individual rope-like hanks of plasticized material can drop out freely without hindrance at any place on the periphery of the cone.

Although certain specific features of the invention have been described in detail for purposes of illustration, it will be evident to those skilled in the art that the invention is capable of various modifications and adaptations within the scope of the appended claims.

The invention claimed is:

1. Apparatus for mechanically homogenizing and kneading plastic masses comprising a rotatable conical body and a closely adjacent surrounding conical sleeve forming a conical space which is of substantially uniform width throughout its length and is entirely open and unobstructed at its greatest diameter, means for introducing a plastic mass into the space between said body and said sleeve in the vicinity of the smaller diameter of said body, and spaced ribs on said rotatable conical body approximately filling the space between said body and said sleeve and extending in the general direction of the axis of said body.

2. Apparatus according to claim 1, in which said ribs are arranged slantwise with respect to the axis of said rotatable body.

References Cited in the file of this patent

UNITED STATES PATENTS

| 744,705 | Adams | Nov. 24, 1903 |
| 1,420,959 | Bowen et al. | June 27, 1922 |
| 2,162,778 | Kent | June 20, 1939 |
| 2,200,997 | Royal | May 14, 1940 |
| 2,581,031 | Kruzik | Jan. 1, 1952 |

FOREIGN PATENTS

| 14,253 | France | Oct. 24, 1911 |